(12) United States Patent
Applegate et al.

(10) Patent No.: US 9,022,570 B2
(45) Date of Patent: May 5, 2015

(54) METHOD FOR DESIGNING AND MANUFACTURING CUSTOM OPTICS

(75) Inventors: Raymond A. Applegate, Houston, TX (US); Jason D. Marsack, Houston, TX (US); Konrad Pesudovs, Glenelg (AU)

(73) Assignee: The University of Houston System, Houston, TX (US)

( * ) Notice: Subject to any disclaimer, the term of this patent is extended or adjusted under 35 U.S.C. 154(b) by 869 days.

(21) Appl. No.: 12/084,881

(22) PCT Filed: Nov. 9, 2006

(86) PCT No.: PCT/US2006/043613
§ 371 (c)(1),
(2), (4) Date: May 9, 2008

(87) PCT Pub. No.: WO2009/014509
PCT Pub. Date: Jan. 29, 2009

(65) Prior Publication Data
US 2011/0157545 A1  Jun. 30, 2011

Related U.S. Application Data

(60) Provisional application No. 60/734,823, filed on Nov. 9, 2005.

(51) Int. Cl.
*A61B 3/00* (2006.01)
*G02C 7/04* (2006.01)
*G02C 7/02* (2006.01)

(52) U.S. Cl.
CPC *G02C 7/04* (2013.01); *G02C 7/027* (2013.01); *G02C 7/028* (2013.01); *G02C 7/047* (2013.01); *G02C 7/048* (2013.01); *G02C 2202/22* (2013.01)

(58) Field of Classification Search
USPC .................. 351/177, 246; 623/6.11
See application file for complete search history.

(56) References Cited

U.S. PATENT DOCUMENTS

| | | | |
|---|---|---|---|
| 6,176,580 B1 | 1/2001 | Roffman | 351/177 |
| 6,663,240 B2 | 12/2003 | Patel | 351/200 |
| 7,771,053 B2 * | 8/2010 | Polland et al. | 351/246 |
| 2002/0105617 A1 * | 8/2002 | Norrby et al. | 351/177 |
| 2003/0107703 A1 | 6/2003 | Cox | 351/161 |
| 2003/0206270 A1 | 11/2003 | Katzman | 351/168 |
| 2004/0156014 A1 * | 8/2004 | Piers et al. | 351/168 |
| 2004/0169820 A1 | 9/2004 | Dai | |
| 2004/0246440 A1 | 12/2004 | Andino | |
| 2004/0263786 A1 | 12/2004 | Williams | 351/246 |
| 2006/0274261 A1 * | 12/2006 | Andino et al. | 351/159 |

FOREIGN PATENT DOCUMENTS

| WO | WO 01/11418 A1 | 2/2001 |
|---|---|---|
| WO | WO 02/45577 A1 | 6/2002 |

(Continued)

*Primary Examiner* — James Greece
(74) *Attorney, Agent, or Firm* — Benjamin Aaron Adler

(57) ABSTRACT

Provided herein are methods of manufacturing an optical lens using image simulation and/or predictive metrics to determine optical aberrations and an iterative algorithm to correct the aberrations to create a custom-designed surface for the optical lens and to implement the manufacture of the custom-designed surface onto the lens. Also, a computer program product storing the method is provided. In addition, there are provided a customized optical lens designed by the method and a method of correcting optical aberration to improve visual using the customized optical lens. Further provided is a method of manufacturing a custom lens effective to mimic a subset of optical aberrations.

21 Claims, 3 Drawing Sheets

(56) References Cited

FOREIGN PATENT DOCUMENTS

| WO | WO 03/050594 A2 | 6/2003 |
| WO | WO 2004/112576 A2 | 12/2004 |
| WO | WO 2005/079546 A2 | 9/2005 |
| WO | WO 2005/098519 | 10/2005 |

* cited by examiner

| ID | Value | ID | Value | ID | Value |
|---|---|---|---|---|---|
| A1 | 1 | AA27 | 1 | BA48 | 1 |
| B3 | 1 | AB28 | -1 | BB47 | -1 |
| C2 | 1 | AC36 | -1 | BC46 | 1 |
| D4 | 1 | AD35 | 1 | BD56 | 1 |
| E5 | -1 | AE34 | -1 | BE57 | -1 |
| F6 | -1 | AF33 | 1 | BF58 | 1 |
| G10 | -1 | AG32 | 1 | BG59 | -1 |
| H9 | 1 | AH31 | -1 | BH60 | 1 |
| I8 | 1 | AI30 | 1 | BI61 | 1 |
| J7 | -1 | AJ29 | -1 | BJ32 | -1 |
| K11 | -1 | AK37 | -1 | BK63 | 1 |
| L12 | 1 | AL38 | 1 | BL64 | -1 |
| M13 | 1 | AM39 | -1 | BM65 | 1 |
| N14 | -1 | AN40 | 1 | BN66 | -1 |
| O15 | 1 | AO41 | 1 | | |
| P21 | 1 | AP42 | -1 | | |
| Q20 | 1 | AQ43 | 1 | | |
| R19 | 1 | AR44 | -1 | | |
| S18 | 1 | AS45 | 1 | | |
| T17 | -1 | AT55 | 1 | | |
| U16 | 1 | AU54 | -1 | | |
| V22 | 1 | AV53 | 1 | | |
| W23 | -1 | AW52 | -1 | | |
| X24 | 1 | AX51 | -1 | | |
| Y25 | 1 | AY50 | 1 | | |
| Z26 | -1 | AZ49 | -1 | | |

NAME.F'N'--------->  ---> IIIEENNN.txt
or NAME.txt or NAME.zer      ---> OCU_DSN_IIIEENNN_coeff.xls
     ---> Figure(1)
     ---> Figure(2)
     ---> Figure(3)

METHOD FOR DESIGNING AND MANUFACTURING CUSTOM OPTICS

CROSS-REFERENCE TO RELATED APPLICATIONS

This U.S. national stage application is filed under 35 U.S.C. 363 and claims benefit of priority under 35 U.S.C. 365 of international application PCT/US2006/043613, filed Nov. 9, 2006, now abandoned, which claims benefit of priority under 35 U.S.C. 119(e) of provisional U.S. Ser. No. 60/734,823, filed Nov. 9, 2005.

FEDERAL FUNDING LEGEND

This invention was produced in part using funds obtained through grants NIH/NEI R01 EY05280, NIH/NEI T32 EY07024 and NIH/NEI P30 EY007551 from the National Institutes of Health. Consequently, the federal government has certain rights in this invention.

COMPUTER PROGRAM LISTING APPENDIX

Computer program listings are submitted on compact disc in compliance with 37 C.F.R. §1.96 and are incorporated by reference herein. A total of two (2) compact discs (including duplicates) are submitted herein. The files on each compact disc are listed below, but are in text format:

| Files | Size (KB) | Date Created |
|---|---|---|
| ZernickePolynomial.txt | 12 | Nov. 08, 2006 |
| Interfaces | | |
| UserInterface.txt | 8 | Nov. 08, 2006 |
| UserInterfaceNoControl.txt | 8 | Nov. 08, 2006 |
| UserInterfaceControl.txt | 8 | Nov. 08, 2006 |
| UIPhaseRetarder.txt | 8 | Nov. 08, 2006 |
| UIContactLens.txt | 8 | Nov. 08, 2006 |
| MarkingCode.txt | 36 | Nov. 08, 2006 |
| DiskACheck.txt | 8 | Nov. 08, 2006 |
| ProgControlVariables.txt | 8 | Nov. 08, 2006 |
| LensDesignVariables.txt | 8 | Nov. 08, 2006 |
| Input | | |
| ZernickeInput.txt | 8 | Nov. 08, 2006 |
| Pattern.txt | 8 | Nov. 08, 2006 |
| Output | | |
| VOIFile.txt | 8 | Nov. 08, 2006 |
| Coefficients.txt | 8 | Nov. 08, 2006 |
| Design | | |
| Clock.txt | 8 | Nov. 08, 2006 |
| AssignCutVariables.txt | 8 | Nov. 08, 2006 |
| BuildVOL.txt | 8 | Nov. 08, 2006 |
| ZernickeDesign.txt | 8 | Nov. 08, 2006 |
| ReadZernickeDesign.txt | 12 | Nov. 08, 2006 |
| RedefinePupilRadius.txt | 8 | Nov. 08, 2006 |
| ReadMaskFile.txt | 8 | Nov. 08, 2006 |
| WhichCoeffUsed.txt | 8 | Nov. 08, 2006 |
| VertexDistance.txt | 8 | Nov. 08, 2006 |
| CoordinateDiffCorrect.txt | 8 | Nov. 08, 2006 |
| BuildFourDesignTypes.txt | 8 | Nov. 08, 2006 |
| GraphZernicke.txt | 8 | Nov. 08, 2006 |
| RemoveBlendZone.txt | 8 | Nov. 08, 2006 |
| Lens Design | | |
| LensMaterials.txt | 8 | Nov. 08, 2006 |
| CalcLensDesignVar.txt | 8 | Nov. 08, 2006 |
| SoftLensExpansion.txt | 8 | Nov. 08, 2006 |
| WavefrontOffset.txt | 8 | Nov. 08, 2006 |
| BuildPrismOffset.txt | 4 | Nov. 08, 2006 |
| BuildAssymBase.txt | 4 | Nov. 08, 2006 |
| LensSurface.txt | 4 | Nov. 08, 2006 |
| TranslateZernicke.txt | 4 | Nov. 08, 2006 |
| BaseCurvePheripheralSurface.txt | 4 | Nov. 08, 2006 |
| BaseCurvePheripheralSurface2.txt | 4 | Nov. 08, 2006 |
| FrontLensSlabOff.txt | 4 | Nov. 08, 2006 |
| BasicLensSurfaceRotation.txt | 4 | Nov. 08, 2006 |
| CombineWavefronts.txt | 4 | Nov. 08, 2006 |
| OutputDesignParameters.txt | 8 | Nov. 08, 2006 |
| End Design | | |
| VOIFileSphericity.txt | 8 | Nov. 08, 2006 |
| CreateVOIFile.txt | 8 | Nov. 08, 2006 |
| PlotWavefrontSurface.txt | 8 | Nov. 08, 2006 |
| PlotLensOpticalZone.txt | 8 | Nov. 08, 2006 |
| CalcNumericalRMS.txt | 8 | Nov. 08, 2006 |
| LogParameters.txt | 8 | Nov. 08, 2006 |
| DestroyGraphs.txt | 8 | Nov. 08, 2006 |

BACKGROUND OF THE INVENTION

1. Field of the Invention

This present invention relates generally to the fields of custom optics and the manufacture thereof. More specifically, the present invention relates to a closed loop algorithm for intelligently designing and manufacturing custom optics and in particular, but not limited to, ophthalmic optics.

2. Description of the Related Art

Standard ophthalmic optics only allow for the correction of a small subset of optical defects in the human eye, namely sphere, cylinder and prism. These defects are easily corrected and provide adequate visual performance in the vast majority of normal subjects. However, there are visual advantages to correcting additional defects in the eye. These advantages are particularly well seen when dealing with eyes that have elevated levels of optical defects which can occur, for example, naturally, as a result of disease or as a result of surgical intervention on the eye.

For example, higher order ocular aberrations can significantly impact visual performance. While these higher order aberrations can be easily quantified, current contact lens designs do not provide an intelligent design philosophy that allows for the minimization of these aberrations and optimization of visual performance on an individual basis. Furthermore, the current state of the art lacks sensitive clinically deployed method to determine the relative impact of these aberrations on visual performance.

Thus, there is a need in the art for improvements in the design philosophy of customized optics and methods of manufacturings the same. Specifically, the prior art is deficient in methods to design, implement and verify custom optics using the optical and physical characteristics of the individual eye to identify significant aberrations and intelligent design of the optical zone of custom optics and fitting and stabilization properties of the lens. The present invention fulfills this long-standing need and desire in the art.

SUMMARY OF THE INVENTION

The present invention is directed to a method for manufacturing a customized optical lens. The method comprises a) identifying a minimal subset of optical aberrations present in an eye via image simulation, predictive metrics or a combination thereof, where correction of the optical aberrations maximizes visual performance of the eye, b) inputting physical values measured on the eye necessary to maximally stabilize an optical lens in a manner consistent with ocular health c) integrating the minimal subset of aberrations via an algorithm designed to minimize the subset of aberrations with reference to the stabilization achieved in step b) as a custom-designed surface for the optical lens effective to maximize visual performance, and d) implementing construction of the custom surface onto the stabilized lens thereby manufacturing a customized optical lens.

The present invention is directed to a related invention comprising the further method steps of evaluating the manufactured customized optical lens for optimal performance. The present invention is directed to another related invention comprising the further method steps of modifying the optical lens design and iterating steps a) and d) to improve optimization.

The present invention is also directed to an optical lens having a surface-customized correction for a minimal subset of optical aberrations maximally effecting visual performance. The customized optical lens is constructed by a method comprising a) identifying a minimal subset of optical aberrations present in an eye via image simulation, predictive metrics or a combination thereof, where correction of the optical aberrations maximizes visual performance of the eye, b) inputting physical values measured on the eye necessary to maximally stabilize the optical lens in a manner consistent with ocular health c) integrating the minimal subset of aberrations via an algorithm designed to minimize the subset of aberrations with reference to the stabilization achieved in step b) as a custom-designed surface for the optical lens effective to maximize visual performance, and d) implementing construction of the custom surface onto the stabilized lens.

The present invention is directed further to a method of correcting optical aberration to improve visual performance. The method comprises manufacturing the customized optical lens described herein using a minimal subset of optical aberrations determined for the subject and placing the customized optical lens on, in or in the path of the eye having the optical aberrations, thereby correcting the visual acuity of a subject.

The present invention is directed further still to a computer program product having a memory that tangibly stores processor-executable instructions for performing a method for customizing the design and manufacture of an optical lens. The method comprises a) inputting physical values measured on the eye necessary to maximally stabilize an optical lens in a manner consistent with ocular health; b) integrating a minimal subset of aberrations present in an eye via an algorithm designed to minimize the subset of aberrations with reference to the stabilization achieved in step a) as a custom-designed surface for the optical lens effective to maximize visual performance; and c) implementing construction of the custom surface onto the stabilized lens. The present invention also is directed to a related invention comprising the further method steps of inputting modified values and iteratively repeating steps a) to c).

The present invention is directed further still to a method for manufacturing a customized lens. The method comprises a) identifying a subset of optical aberrations b) integrating the subset of aberrations via an algorithm designed to mimic the subset of optical aberrations as a custom designed surface for the lens and c) implementing construction of the custom surface onto the lens thereby manufacturing a customized lens. The present invention also is directed to a related invention comprising the further method step of evaluating the manufactured customized lens for optimal performance.

Other and further aspects, features, and advantages of the present invention will be apparent from the following description of the presently preferred embodiments of the invention. These embodiments are given for the purpose of disclosure.

BRIEF DESCRIPTION OF THE DRAWINGS

So that the matter in which the above-recited features, advantages and objects of the invention, as well as others which will become clear, are attained and can be understood in detail, more particular descriptions of the invention briefly summarized above may be had by reference to certain embodiments thereof which are illustrated in the appended drawings. These drawings form a part of the specification. It is to be noted, however, that the appended drawings illustrate preferred embodiments of the invention and therefore are not to be considered limiting in their scope.

FIG. 2A shows a perfect log MAR acuity chart. FIG. 2B shows a log MAR acuity chart that has undergone image simulation with the optical defects typical of the eye disease keratoconus.

DETAILED DESCRIPTION OF THE INVENTION

Figures 1, 2A, 2B, 2C:
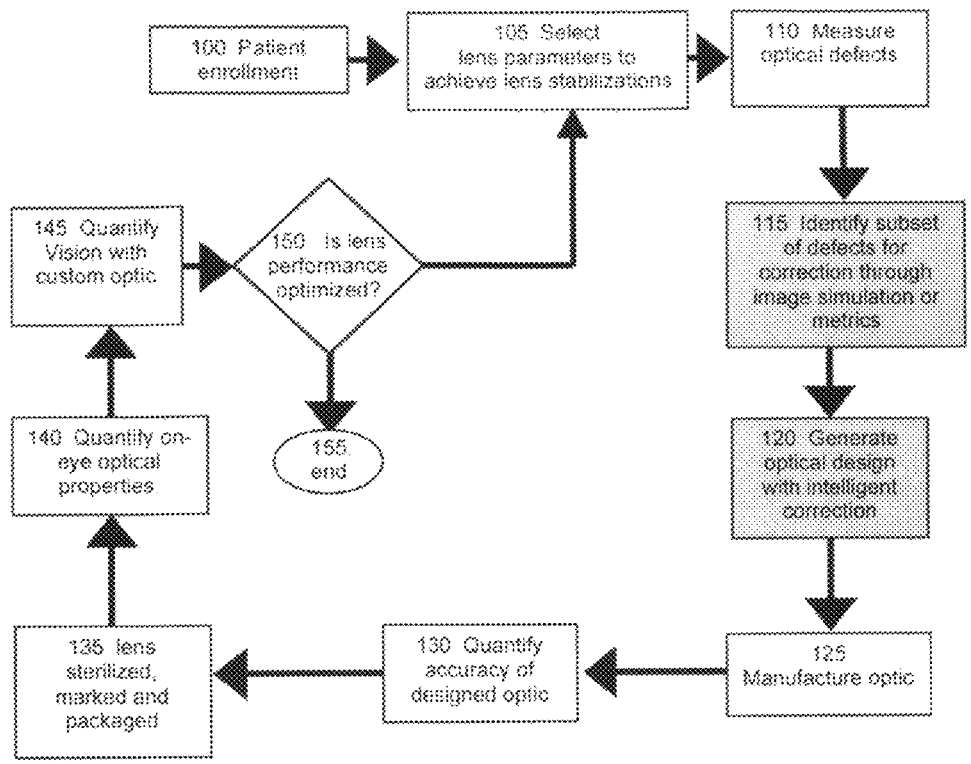
FIG. 1 depicts the general algorithm useful for manufacturing custom optical corrections. Both image simulation and/or metrics (step 115) and intelligent correction (step 120) are integrated into this general algorithm.
FIGS. 2A-2B depict image simulations demonstrating how optical defects in the keratoconic eye reduce visual performance.
FIG. 2C shows a log MAR chart where specific (but not all) optical defects present in 2B have been corrected. In this sequence, image simulation has been used to determine which aberrations are most detrimental to visual performance, and must be corrected in a custom optic using the intelligent correction process.

As used herein, the term "a" or "an" when used in conjunction with the term "comprising" in the claims and/or the specification may mean "one," but it is also consistent with the meaning of "one or more," "at least one," and "one or more than one." Some embodiments of the invention may consist of or consist essentially of one or more elements, method steps, and/or methods of the invention. It is contemplated that any method described herein can be implemented with respect to any other method described herein.

As used herein, the term "or" in the claims is used to mean "and/or" unless explicitly indicated to refer to alternatives only or the alternatives are mutually exclusive, although the disclosure supports a definition that refers to only alternatives and "and/or."

As used herein, the term "subject" refers to any recipient of the custom optical lenses designed and manufactured herein. Preferably, the subject is a mammal, more preferably the subject is a human.

As used herein, the term "image simulation" refers to the convolution of the point spread function resulting from the residual aberration structure of any given optical system, e.g., the eye plus correction.

As used herein, the term "intelligent correction" refers to a process using the closed-loop algorithm described herein to implement a specific optical correction to compensate for optical defects most deleterious to visual performance identified via image simulation and/or predictive metrics.

As used herein, the term "predictive metric" refers to any number of image quality metrics or visual performance metrics.

In one embodiment of the present invention there is provided a method for manufacturing a customized optical lens, comprising a) identifying a minimal subset of optical aberrations present in an eye via image simulation, predictive metrics or a combination thereof, wherein correction of the optical aberrations maximizes visual performance of the eye; b) inputting physical values measured on the eye necessary to maximally stabilize an optical lens in a manner consistent with ocular health; c) integrating the minimal subset of aberrations via an algorithm designed to minimize the subset of aberrations with reference to the stabilization achieved in step b) as a custom-designed surface for the optical lens effective to maximize visual performance; and d) implementing construction of the custom surface onto the stabilized lens thereby manufacturing a customized optical lens.

Further to this embodiment the method may comprise evaluating the manufactured customized optical lens for optimal performance. In this further embodiment evaluating may comprise meausuring the optical properties of the manufactured lens, resultant lens on-eye stability, residual aberrations, and resultant visual performance. Further still to this further embodiment the method may comprise modifying the optical lens design and iterating steps a) to d) to improve optimization.

In all these embodiments the eye may be a normal eye, may have a pathophysiological condition, may have a traumatic condition or an injurious condition or had a surgical procedure performed thereon. Examples of the specific condition may be keratoconus, corneal transplant, pellucid marginal degeneration, trauma, or poor refractive surgery outcome. The optical lens may be a contact lens, a spectacle lens, an intra-ocular lens, a corneal inlay, a corneal onlay, a benchtop optic or a phase retarder.

In another embodiment of the present invention there is provided an optical lens having a surface-customized correction for a minimal subset of optical aberrations maximally effecting visual performance constructed by a method comprising a) identifying a minimal subset of optical aberrations present in an eye via image simulation, predictive metrics or a combination thereof, where correction of the optical aberrations maximizes visual performance of the eye, b) inputting physical values measured on the eye necessary to maximally stabilize the optical lens in a manner consistent with ocular health c) integrating the minimal subset of aberrations via an algorithm designed to minimize the subset of aberrations with reference to the stabilization achieved in step b) as a custom-designed surface for the optical lens effective to maximize visual performance, and d) implementing construction of the custom surface onto the stabilized lens. In this embodiment the eye, including optical aberrations present therein and specific conditions, the predictive metrics and visual performance, and optical lenses are as described supra.

In yet another embodiment of the present invention there is provided a method of correcting optical aberration to improve visual performance, comprising manufacturing the customized optical lens described herein using a minimal subset of optical aberrations determined for the subject; and placing the customized optical lens on, in or in the path of the eye having the optical aberrations, thereby correcting the visual acuity of a subject. In this embodiment the subject, the subject's eyes and the conditions thereof are as described supra. Also, in this embodiment the lens may be a contact lens, a spectacle lens, a phase retarder, an intra-ocular lens, a corneal inlay, or a corneal onlay.

In yet another embodiment of the present invention there is provided a computer program product having a memory that tangibly stores processor-executable instructions for performing a method for customizing the design and manufacture of an optical lens, said method comprising a) inputting physical values measured on the eye necessary to maximally stabilize an optical lens in a manner consistent with ocular health; b) integrating a minimal subset of aberrations present in an eye via an algorithm designed to minimize the subset of aberrations with reference to the stabilization achieved in step b) as a custom-designed surface for the optical lens effective to maximize visual performance; and c) implementing construction of the custom surface onto the stabilized lens. Further to this embodiment the method may comprise inputting modified values and iteratively repeating steps a) to c). In both embodiments the minimal subset of optical aberrations may be identified via image simulation, predictive metrics or a combination thereof. An example of predictive metrics may include retinal image quality metrics.

In yet another embodiment of the present invention there is provided a method for manufacturing a customized lens, comprising a) identifying a subset of optical aberrations; b) integrating the subset of aberrations via an algorithm designed to mimic the subset of aberrations as a custom designed surface for the optical lens; and c) implementing construction of the custom surface onto the lens thereby manufacturing a customized lens. Further to this embodiment the method comprises evaluating the manufactured customized lens for optimal performance.

Provided herein is a closed loop algorithm that allows the creation of custom optics. The algorithm identifies and seamlessly integrates the necessary design, manufacture and evaluation hardware, includes custom software that allows the generation of optics with custom optical zones and edge properties for specific applications and includes custom software that integrates manufacture components. The method is applicable to the design of any optical component, and in healthcare is most readily applicable to the design of customized ophthalmic optics.

The method provided herein comprises two processes. The first is a process for manufacturing optics. An algorithm is defined to identify and integrate the necessary design, manufacture and evaluation aspects of the methods. This algorithm specifies the generation of completely custom optics with full design control over the optical zone, peripheral zones, transition zones, edge properties, thickness characteristics and ballast properties, all of which can be modified for specific applications.

The second process guides the manufacture of the custom optics described above by identifying a correcting surface to be placed in the optic. It is demonstrated herein that correction of specific optical defects in the human eye can improve visual performance. Further, the optical defects can be determined for a given individual in order to maximize visual performance, truly customizing the process to the needs of the subject. The process of determining what optical defects are most important to visual performance is accomplished through image simulation or metrics, a process by which optical quality is simulated (image simulation) or predicted (metrics) allowing normal observers to either "see the world through an optically defective eye" or objectively evaluate optical quality using an appropriate metric. Once the optical defects most deleterious to visual performance are identified, the closed loop algorithm is used to implement the specific optical correction to compensate for such defects. This is "intelligent correction." This provides a process of manufacture that is truly customized respecting unavoidable constraints of the particular system one is correcting.

The myopic or near-sighted eye may be used as a nonlimiting example to demonstrate the two processes. When a myopic eye views a visual target without the aid of spectacles, the image is blurred, and visual performance is reduced. However, when the myopic eye views a visual target with proper spectacles, the image formed on the retina is well-focused. This is because the spectacles compensate for the optical defect of the myopic eye. The correction in this case can be determined using conventional ophthalmic equipment, such as subjective refraction or an autorefractor, due to the simplicity of the optical defect.

The perception of the visual target for the myopic eye under uncorrected and corrected conditions described above can be demonstrated via image simulation. This would create two visual targets: one with blur (uncorrected case) and one with minimal blur (corrected case). These two visual targets are viewed by a well corrected, normal observer allowing them to "see the world as the myopic eye sees the world." Alternatively, the uncorrected and corrected cases can be objectively evaluated using metrics.

However, when the defects of eyes become more complicated, as in keratoconus or post-refractive surgery, many permutations of correction may be needed to identify an optimal correction. Once a set of candidate corrections are identified, image simulation and the use of metrics allows for systematic evaluation of the corrections in a controlled environment. Once all candidate corrections are tested, the correction allowing for optimal visual performance is identified and is used as input into the design of an optical correction. Correction of a minimal subset of defects instead of correction of all defects is desirable because the correction of all or even most of the aberrations often leads to stabilization requirements and/or manufacturing requirements that are impractical. The minimal subset provides the best possible vision with the greatest tolerance to decentration and rotation of the optic.

The methods and closed loop algorithms provided herein are useful to produce custom optics and to correct optical aberration in an optical system, including ophthalmic and non-ophthalmic systems. Ophthalmic optics may include, but are not limited to, contact lenses, phase retarders, spectacle lenses, intra-ocular lenses, corneal inlays, or corneal onlays. In addition, benchtop optics, phase retarders and other custom optics may be customized in a non-ophthalmic system. As such the present invention provides customized optical lenses designed and manufactured by the methods and processes described herein.

Generally, it is contemplated that customization may be specific for a single subject or may be a condition-specific customization, where it has been shown, for example, that in a specific eye disease or other condition the correction of certain aberrations typically results in good visual performance. Thus, these customized ophthalmic optics are useful to improve visual performance in subjects having normal eyes, a pathophysiological condition or a traumatic or an injurious condition of one or both eye or having had a surgical procedure performed on one or both eyes. Without being limiting, representative examples of such conditions may include keratoconus, corneal transplant, pellucid marginal degeneration, corneal trauma, or poor refractive surgery outcome. It is well within the purview of one of ordinary skill in the art to determine whether a subject is a candidate for customized ophthalmic optics as described herein or whether certain optical aberrations are commonly associated with specific disease states or post-surgical states of the eye.

The present invention also provides a computer program product having a memory that stores instructions to at least execute the method steps for customizing the design and manufacture of an optical lens. Such computer program products and memories comprising the same are well-known and standard in the art. For example, the memory may be stored on a computer having a processor effective to perform the steps on the stored memory. Alternatively, the memory may comprise a computer diskette or memory stick or other hard storage media as are well-known in the art. Furthermore, the present invention provides the source code necessary for practice of the methods disclosed herein by one of ordinary skill in the art, including source code for matlab compatible $10^{th}$ order Zernike polynomial. As required, the source code for the algorithms and methods provided herein is included in text format on two CD-Rs, the file names of which are identified in the Computer Program Listing Appendix. The contents of the source code files is presented in international application PCT/US2006/043136, to which priority is claimed, and which is hereby incorporated by reference in its entirety.

The following example(s) are given for the purpose of illustrating various embodiments of the invention and are not meant to limit the present invention in any fashion.

Example 1

Lens Manufacture Algorithm

The first component of the method described herein is an algorithm by which custom optics can be designed and manufactured. This algorithm can be used to design and manufacture contact lenses for any individual for which contact lenses are clinically indicated. The algorithm is depicted in FIG. 1.

The process begins at step 100 in a manner similar to conventional lens dispensation, i.e., the subject is evaluated by a clinician. If the subject is deemed a candidate for contact lens wear, contact lens parameters such as lens base curves, diameter, prism ballast, and power are determined and are iterated until a rotationally and translationally stable lens is achieved at step 105. In order to facilitate customization of the lens to the subject's optical defects, a full description of the optical defects of the eye(s) is quantified at step 110 with the stabilized lens on and off.

At step 115 a minimal subset of the residual optical defects (lens/eye system) which are most deleterious to visual performance is identified through image simulation and/or the use of metrics. This subset is integrated with the lens parameters, such as base curves, diameter, prism ballast, edge properties, thickness, etc. in defining the custom surface of the optic at step 120. This surface is interpreted and produced by a manufacturing tool such as a diamond turning lathe or other system capable of implementing the custom correction at step 125. The lens is evaluated to assure correct and accurate manufacture at step 130. The lens is sterilized, marked for orientation and packaged according to all applicable laws and regulations at step 135. The on-eye lens performance is evaluated, including lens comfort and movement at step 140 and visual performance is evaluated at step 145.

The total performance of the lens-eye system is evaluated at step 150 If the exit criteria is met, the process ends at step 155. Otherwise an iteration modifying the lens is initiated at step 105. If lens is stable no changes are made and step 110 is initiated and the loop repeated until exit criterion is reached. Exit criterion is subject specific.

Example 2

Description of Optical Defects

The implementation of custom ophthalmic optics used herein is determined by wavefront sensing. Wavefront sensors can determine the optical error, also referred to as optical defects or aberrations, present in an eye. Currently, the Zernike expansion is the ANSI standard (ANSI Z80.28) fitting function for describing ocular wavefront error, and is used here to describe optical aberration. The Zernike expansion is a long-established method for defining optical errors and is not unique to the eye and is not necessary to the methods being described. Any mathematical method could be used that adequately defines the optical defects of the eye. The Zernike expansion is used herein for illustrative purposes and because it is the national standard established for describing ocular wavefront error.

Example 3

Image Simulation

FIGS. 2A-2B demonstrate the process of image simulation. FIG. 2A shows a non-blurred visual target. FIGS. 2B and 2C show targets that are blurred using image simulation. The process used to form a blurred image is convolution.

First, the eye's aberrations are used to define a point spread function. This function describes the spatial distribution of a point of light after having been imaged by an optical system. Second, the point spread function is applied to the larger image, which is constructed from a finite number of point sources. The summed impact of distortions caused by the point spread function on all points in the image is seen as the blurred visual target.

The optical defects used to blur the chart in FIG. 2B provide an idea of how aberrations impact visual performance. FIG. 2C shows a visual target where a subset, but not the complete set, of the optical defects used to blur the image in 2B has been corrected. Note that FIG. 2C is similar in appearance to 2A, demonstrating that the aberrations which remain uncorrected have minimal impact on this measure of visual performance. Other measures of visual performance important to a particular subject could be used in place of a high contrast high luminance visual acuity chart, e.g., face recognition, low contrast acuity, contrast sensitivity, etc. Alternatively, instead of image simulation, metrics can be used to objectively quantify optical quality.

Thus, image simulation and/or metrics are used to identify the minimum set of aberrations that can be used in intelligent correction to produce optics. Correcting the minimum number of aberrations that provide the best possible vision reduces the constraints for perfect alignment making the correction feasible in the real world environments where perfect alignment regardless of the method of correction is not always practical or achievable.

Figure 3:
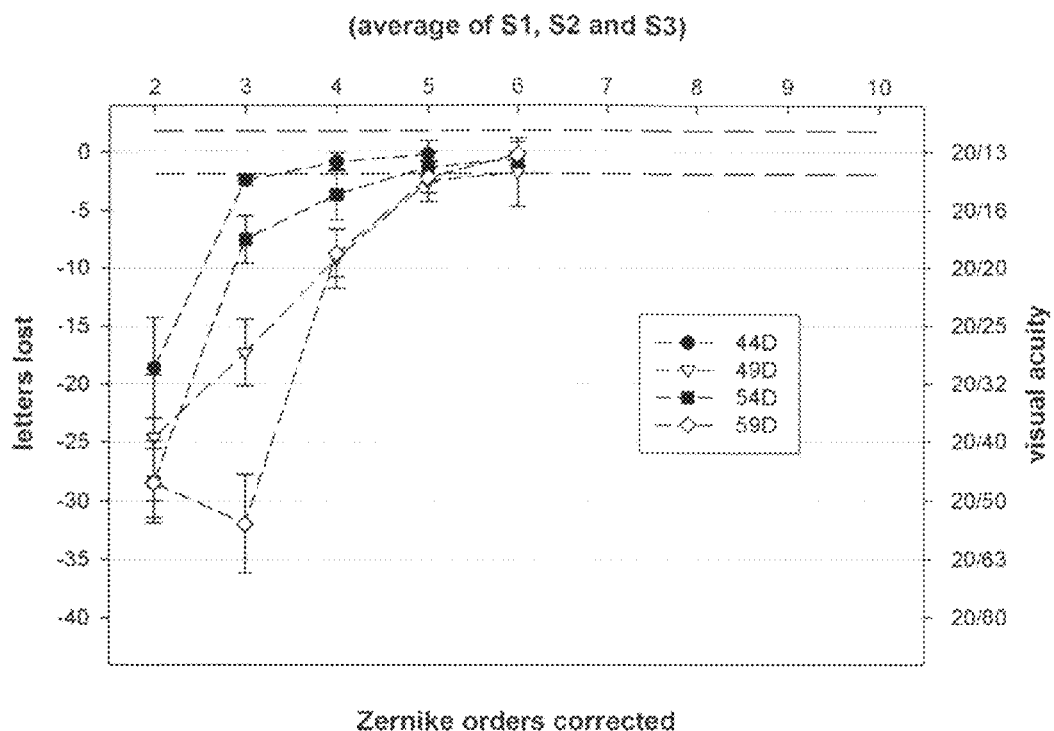
FIG. 3 shows results from image simulation of four keratoconus eyes. Visual performance is plotted on the ordinate and the complexity of the simulated correction represented as Zernike radial order is plotted on the abscissa. The point at which the data are equivalent to zero letters lost represents the point at which the simulated optic has returned visual performance to near normal levels. Here, this is equivalent to 20/13 visual acuity (better than 20/20). In this example this set of aberrations can then be passed to the algorithm for implementation in intelligent correction.

FIG. 3 shows data obtained from experiments using the image simulation process on four keratoconic eyes (individual traces). In this implementation of image simulation, individuals with normal vision are reading letter charts that have been aberrated with the defects of four keratoconic subjects. In this example abscissa plots the Zernike expansion orders that have been corrected. Moving left to right, the correction becomes more inclusive and complete, in that more of the aberration terms are incorporated into the correction. The ordinate plots visual performance. Each data point represents the visual performance for normal individuals reading letter charts aberrated to simulate keratoconic vision.

When the data points return to an ordinate value approaching zero letters lost, the correction is optimized in this example, meaning that the subset of Zernike modes chosen for correction is sufficient to return visual acuity to normal levels and the aberration components that remain uncorrected have minimal to no effect on visual performance. In this example, the 44D eye contains the least amount of optical defects in the group and the 59D contains the most defects in the group. This data, recorded through the use of image simulation, predicts that correction of aberration through the $5^{th}$ or $6^{th}$ Zernike radial order returns vision to normal levels for these subjects. With the identification of what aberrations are detrimental to visual acuity, this information can be used as input to guide the manufacture of custom optics through the intelligent correction process (FIG. 1). Correcting the minimal set of aberrations reduces the alignment constraints of the correcting optics, increasing the probability of successfully providing the subject with a useful correction.

Example 4

Image Simulation and Intelligent Correction in a Keratoconus Subject

Figure 4:
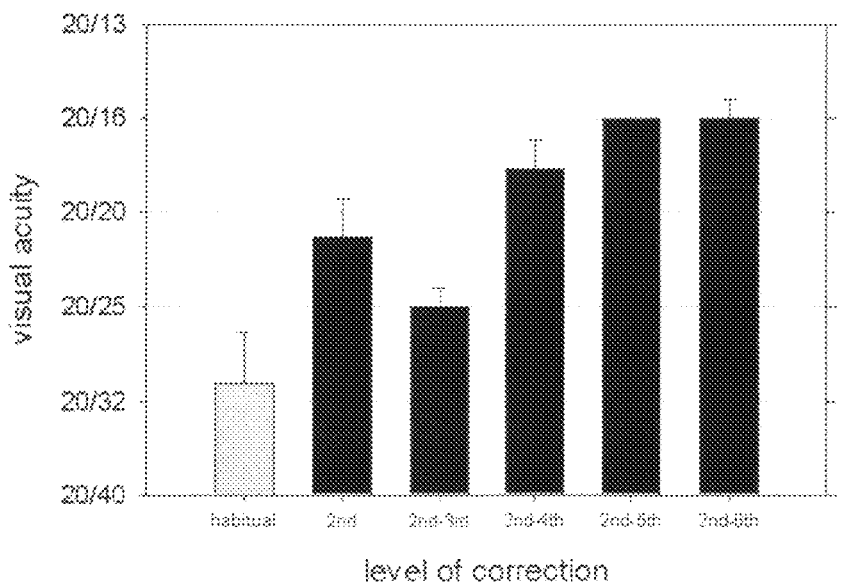
FIG. 4 shows high contrast log MAR visual acuity data for a keratoconic eye viewing letters through a series of increasingly complete custom corrections implemented in the form of phase plates. Habitual contact lens acuity is shown with grey bars. Custom optical corrections ranging from $2^{nd}$ Zernike order to $2^{nd}$-$6^{th}$ Zernike order corrections are shown with black bars. This implementation of intelligent correction predicted that this subject would see best with a $2^{nd}$-$5^{th}$ order correction and that increasing the number of aberrations corrected provides no further benefit. As can be seen in this example, visual performance was maximized with a $2^{nd}$-$5^{th}$ order intelligent design correction. Correcting more aberrations put unnecessary constraints on the design, manufacturing and stability of such corrections.

Results obtained for a subject who has been corrected with custom optics designed according to the method described in this disclosure are shown in FIG. 4. The keratoconic subject being tested in FIG. 4 was viewing unblurred letter charts through phase retarders (black bars) designed from image simulation and intelligent correction. The results are compared to habitual contact lens correction (grey bar). The results demonstrate visual acuity for increasingly complex corrections under high contrast and high luminance viewing conditions. According to FIG. 3, image simulation predicts optimal results at $5^{th}$ order correction, which is seen with custom lenses in FIG. 4. The data demonstrates the ability of the method to be used to identify and implement optimized custom corrections and shows an improvement when compared to the habitual correction.

Example 5

Program for Cutting a Custom Lens

The code generates VOI files that define both front and back surfaces. The lenses are described via a Zernike decomposition. The VOI file to be handed to the lathe for this specifies points the whole lens surface in cylindrical coordinates.

Zernike Polynomial in the OSA Standard Numbering

In the input and output programs, the coefficient numbers are all one more than the standard coefficient to make it compatible with matlab. There are two input files and two output files. For the input files the user is prompted for the name of the two files at program execution. For ZERNICKE INPUT any of three file types can be selected to represent the design. The last_first_number.F* is recorded on COAS wavefront sensor. This file contains Zernike coefficients for the * orders of the .F file. The above format is duplicated for a test file, which is user def for testing purposes. The differences are that the file extension *_OSA.txt and the files are in OSA format (the .F* files are not). These test files do not contain information after coefficient n. The ROORDA format of SHWS files can also be used to define Zernike coefficients. The second output file is 'pattern'.txt: This describes the Zernike terms to be used in the design.

The first output file is VOI FILE: IIIEENNN.txt. This file contains the 3-D representation of the phase plate surface. This file is stored in the DAC lathe and interpreted by the custom code produced by Neal Bergman. The second output file is COEFFICIENTS USED: This file stores the ZERNIKE coefficients used to create the VOI file.

Graphical Representations of Design Data

Figures 5, 6:
FIG. 5 depicts those elements of a 66×66 element matrix that have a non-zero value for the conversion of aberration data recorded on a COAS wavefront sensor into ANSI standard Zernike coefficients. Each element has a unique designator with an alphabetic column indicator (A to BN) and a numeric row indicator (1 to 66).
FIG. 6 depicts the program schematic to generate three figures to graphically represent design data.

The program generates three figures to graphically represent design data. The first figure is a graph of Zernike coefficients used in design of the VOI file. The second figure is a 3-D plot of the entire button surface (OZ, blend and shoulder) and the third figure is a 3-D plot of the optical zone. The button angular layout specifies degrees using the OSA standard. All Z height values should be negative, indicating a cut. An example of the program schematic is shown in FIG. 6.

Further Input

The program enables access to the internal computer clock to identify date and time. Also, a user can decide between a front or back side cut and assign variables. Next, the VOI is built using coefficient and profile paths and folders and logfile. First, a folder is made to contain the Zernike profile files measured that day. Profiling is not done in this program, but the folder is made here to aid in bookkeeping. Thus, any VOI file and profile of the button carved with that VOI file can be found under folders named with the same date. Then, a folder is made to contain the Zernike coefficients used in any given design today. NOTE that this will be a subset of the Zernikes used to define the aberration of an eye, depending on the PATTERN FILE used. The Zernike design file and pattern file are chosen and a coefficient file is built. Now, all the user input and necessary files have been obtained. The rest of the program will operate on or store information in these files.

Another file reads the Zernike design file. This program is currently able to read the three types of files described in detail above. The r_pupil_size and um_data are redefined. Then the implement mask file is read. From here, the Zernike expansion is expressed in variable c, not um_data. If a correction is being implemented, it is not reflected in c, rather it is reflected in the surface built from tenth_order_zernike by the way of 'variable is_correction'. A 'Which coefficients were used' file is created. A correction for the coordinate difference between OSA and DAC is made. An allowance is made for the building of all four design types, i.e., PR, CL, eye side, and away side. The Zernike terms are graphed. Coefficients are plotted based on c*is_correction, so they represent what will be carved into the button. Finally, the blend zone is removed.

Interfaces

The program also contains files for various interfaces. The source code codes for a User Interface, User Interface without user controls which are all hard-coded, User Interface with user controls which prompts the user for values, a User Interface for the phase retarder, and a User Interface for the contact lens. Also, there are files for marking code, for checking for disk in A. In addition there are common design codes for program control variables and lens design variables.

Conversion of Aberration Data to ANSI Zernike Coefficients

A 66×66 element matrix is provided that facilitates the conversion of aberration data recorded on a COAS wavefront sensor into ANSI standard Zernike coefficients. This conversion is required because raw data stored in the coefficient data files on the COAS (*.F* files) is not formatted in the ANSI standard Zernike format. Each element as a unique designator with an alphabetic column indicator (A to BN) and a numeric row indicator (1 to 66). With the exception of those elements shown in FIG. 5, all elements contain an assigned value of zero (0).

Lens Design

For the lens design program, files provided are effective to 1) specify lens material properties, 2) calculate lens design variables, and 3) account for expansion if soft lens. Other code files are effective to calculate the wavefront offset The max value for the wavefront corrected portion of the surface is calculated. The value is corrected for hydration if the design is a soft lens through the use of height_corrector. A prism offset is built using OUTPUT: prism_offset including array, negative values, float. Then build an asymmetric base using OUTPUT: prism_offset including array, negative values, and float.

Calculate the portion of lens surface that is derived from Zernike data output, i.e., data & rotated_data, including array, positive and negative, and float. Another file enables the translation of the Zernike portion by an amount measured in the examination apparatus. This converts the Zernike patch from polar to rectangular coordinates, shifts in millimeter amounts specified in the movement apparatus and converts the wavefront portion back to polar coordinates. Calculate the base curve and peripheral surfaces output using BASE_removal_data, including array, negative, and float. Calculate base curve and peripheral surfaces output: BASE_removal_data—array, negative, float. The method for edge radius is stored as BACK.m The slab off portion of front lens design is calculated. The basic lens surface is rotated before combining with wavefront. Then the wavefront surface, wavefront offset, prism offset and ROC are combined. Output design parameters are used to define button surface to screen.

End Design

In the code that defines the end design of the custom optics or lens, variable 'rotated_data' defines the lens surfaces. Generally, the program provides instructions for a sphericity check of the VOI file an for creating a VOI file. The wavefront surface may be plotted, for example, plotting the button surface and wavefront aberration. The program also allows a conversion from polar to cartesian coordinates. Thus, the optical zone of the lens may be plotted.

Also, an error checking metric to calculate numerical RMS is provided. The metric calculates the numerical RMS for a cartesian grid that is built from the ZERNIKE definition c (NOT um_data). Build surface (z values) from c and store in polar coordinates. The parameters are logged to a log file which logs creation of VOI file in design log file. Finally, the instructions enable a pause for a user to press any key to destroy graphs.

One skilled in the art will appreciate that the present invention is well adapted to carry out the objects and obtain the ends and advantages mentioned, as well as those objects, ends and advantages inherent herein. Changes therein and other uses which are encompassed within the spirit of the invention as defined by the scope of the claims will occur to those skilled in the art.

What is claimed is:

1. A method for manufacturing a customized contact lens, comprising the steps of:
    a) measuring optical aberrations in an eye of a subject;
    b) identifying, from among permutations of the optical aberrations measured in the eye via one or both of image simulation or predictive metrics, a subset of optical aberrations comprising the permutation with a minimum number of optical aberrations to be corrected for optimizing the visual performance of the eye;
    c) inputting the subset of optical aberrations;
    d) inputting contact lens parameters associated with the contact lens;
    e) integrating the subset of optical aberrations with the contact lens parameters via an algorithm designed to define and implement a custom correction for the eye; and
    f) implementing the custom correction onto a surface of the contact lens thereby manufacturing a customized contact lens.

2. The method of claim 1, further comprising the step of:
    g) evaluating the optical and visual performance of the manufactured customized contact lens on the subject's eye.

3. The method of claim 2, wherein the step g) of evaluating comprises:
    measuring the optical properties of the manufactured contact lens, resultant lens stability of the manufactured contact lens on the subject's eye, and residual aberrations.

4. The method of claim 2, further comprising the steps of:
    h) modifying the contact lens design based on the optical and visual performance thereof; and
    i) iterating steps a) to f).

5. The method of claim 1, wherein the eye is a normal eye, has a pathophysiological condition, has a traumatic condition or an injurious condition or had a surgical procedure performed thereon.

6. The method of claim 5, wherein the condition is keratoconus, corneal transplant, pellucid marginal degeneration, corneal trauma, or poor refractive surgery outcome.

7. The method of claim 1, wherein predictive metrics comprises retinal image quality metrics.

8. The method of claim 1, wherein visual performance comprises high contrast high luminance visual acuity or low contrast mesopic visual acuity.

9. A contact lens having a surface-customized correction for a subset of optical aberrations effecting visual performance constructed by a method comprising the steps of:
    a) measuring optical aberrations in an eye of a subject;
    b) identifying, from among permutations of the measured optical aberrations, via one or both of image simulation or predictive metrics, a subset of optical aberrations comprising the permutation with a minimum number of optical aberrations to be corrected for optimizing the visual performance of the eye;
    c) inputting the subset of optical aberrations;
    d) inputting contact lens parameters associated with the contact lens;
    e) integrating the subset of optical aberrations with the contact lens parameters via an algorithm designed to define and implement a custom correction for the eye; and
    f) implementing the custom correction onto a surface of the contact lens thereby manufacturing a customized contact lens.

10. The contact lens of claim 9, wherein the optical aberrations are present in normal eyes, an eye having a pathophysiological condition, an eye having a traumatic or an injurious condition or an eye having a surgical procedure performed thereon.

11. The contact lens of claim 10, wherein the condition is keratoconus, corneal transplant, pellucid marginal degeneration, corneal trauma, or poor refractive surgery outcome.

12. The contact lens of claim 9, wherein predictive metrics comprises retinal image quality metrics.

13. The contact lens of claim 9, wherein visual performance comprises high contrast high luminance visual acuity or low contrast mesopic visual acuity.

14. A method of correcting optical aberration for optimizing visual performance in a subject, comprising the steps of:
    a) manufacturing the customized contact lens of claim 9 using the subset of optical aberrations determined for the subject; and
    b) placing the customized contact lens on the eye having the optical aberrations, thereby optimizing the visual performance of the subject.

15. The method of claim 14, wherein the subject's eye is a normal eye, an eye having a pathophysiological condition, an eye having a traumatic or an injurious condition or an eye having a surgical procedure performed thereon.

16. The method of claim 15, wherein the condition is keratoconus, corneal transplant, pellucid marginal degeneration, corneal trauma, or poor refractive surgery outcome.

17. A computer program product for customizing the design and manufacture of a contact lens, said computer program product tangibly stored on a computer having at least a memory and a processor and comprising an algorithm that when executed by the processor performs the steps of:
    a) receiving, as input, optical aberration measurements measured in an eye of a subject;
    b) receiving, as input, a subset comprising a permutation with a minimum number of optical aberrations identified, via one or both of image simulation or predictive metrics, from among permutations of the optical aberration measurements measured in the eye to be corrected for optimizing visual performance of the eye;
    c) receiving, as input, contact lens parameters associated with the contact optical lens;
    d) integrating the subset of optical aberrations with the contact lens parameters to define a custom correction for the eye; and
    e) implementing the custom correction onto a surface of the contact lens.

18. The computer program product of claim 17, the processor-executable steps further comprising the steps of:
    f) receiving, as input, modified values for one or more of the minimum number of optical aberrations in the subset or contact lens parameter after evaluating the optical and visual performance of the customized contact lens on the subject's eye; and
    g) iteratively repeating steps e) to f).

19. The computer program product of claim 18, wherein predictive metrics comprises retinal image quality metrics.

20. A method for manufacturing a customized contact lens, comprising the steps of:
- a) measuring optical aberrations in an eye of a subject;
- b) identifying from among permutations of the measured optical aberrations, via one or both of image simulation or predictive metrics, a subset of optical aberrations comprising the permutation with a minimum number of optical aberrations for optimizing the visual performance of the eye;
- c) integrating the subset of optical aberrations with contact lens parameters for the contact lens via an algorithm designed to mimic the subset as a custom designed surface for the contact lens; and
- d) implementing the custom surface onto the contact lens thereby manufacturing a customized contact lens for the subject.

21. The method of claim 20, further comprising:
- e) evaluating the visual performance of the manufactured customized contact lens on the subject's eye.

* * * * *